Patented Sept. 15, 1931

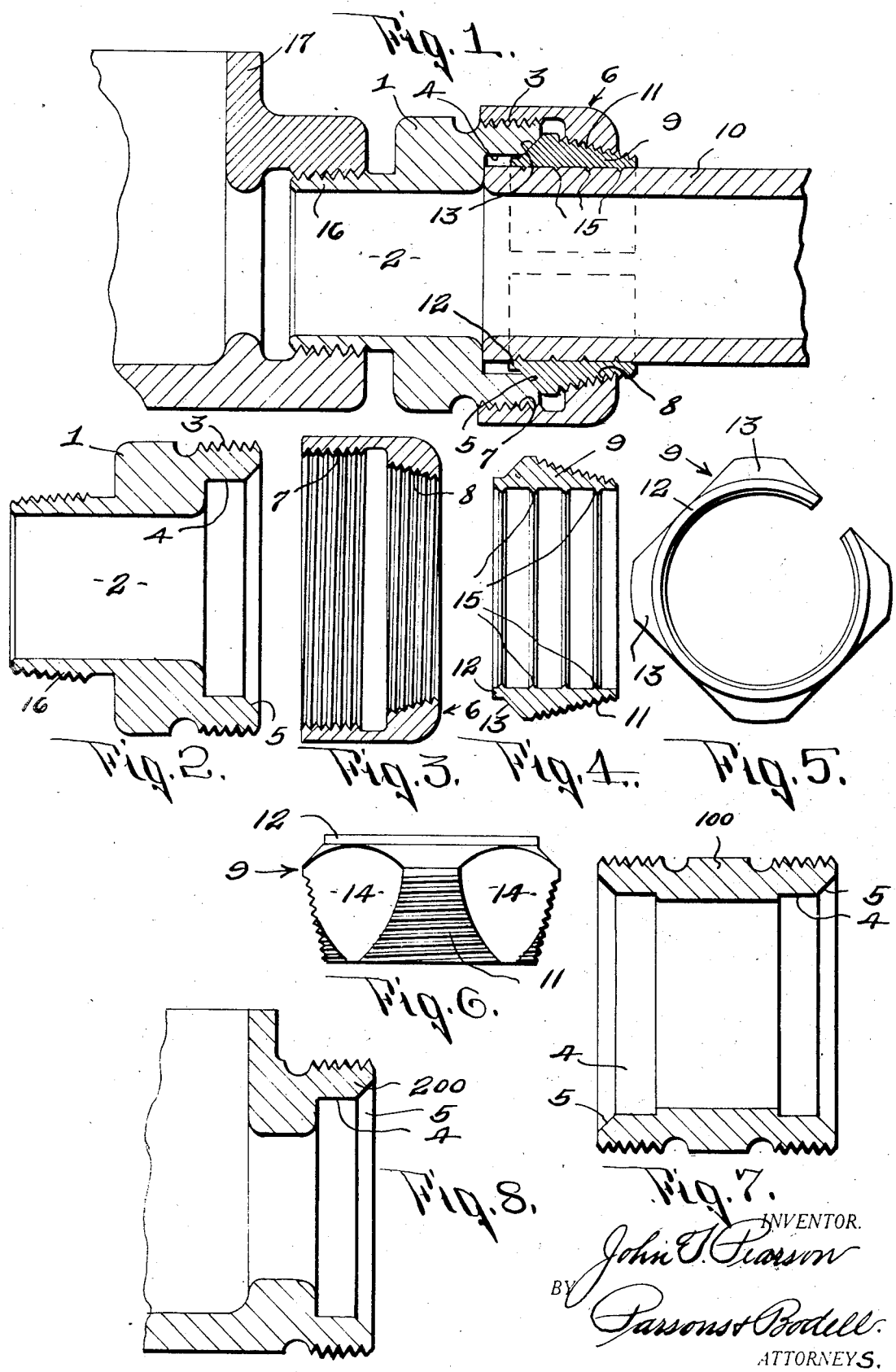

1,823,061

UNITED STATES PATENT OFFICE

JOHN T. PEARSON, OF SYRACUSE, NEW YORK, ASSIGNOR TO CROUSE-HINDS COMPANY, OF SYRACUSE, NEW YORK, A CORPORATION OF NEW YORK

CONDUIT COUPLING

Application filed October 4, 1928. Serial No. 310,343.

This invention relates to conduit or pipe connections, particularly applicable for coupling unthreaded conduits, particularly electrical conduits together or to conduit outlet boxes or other appliances and has for its object a particularly simple and efficient threadless coupling, so called because the pipe to which connection is made is usually threadless, which is self locking from turning in a retrograde direction, or from loosening by turning the pipe.

The invention consists in the novel features and in the combinations and constructions hereinafter set forth and claimed.

In describing this invention reference is had to the accompanying drawings in which like characters designate corresponding parts in all the views.

Figure 1 is a longitudinal vertical sectional view of a coupling embodying my invention, the contiguous portion of the outlet box being also shown.

Figure 2 is a detail sectional view of the body of the coupling.

Figure 3 is a detail sectional view of the nut.

Figures 4, 5 and 6 are respectively a longitudinal sectional view, an end elevation looking to the right of Figure 4, and an edge view of the contractile sleeve of the coupling.

Fig. 7 is a longitudinal sectional view of a double ended body.

Figure 8 is a view similar to Figure 1 of a conduit outlet box integral therewith.

This coupling comprises, generally, a peripherally threaded body having a passage for receiving a pipe end, a nut or collar having threads at one end turning on the body, a contractile sleeve for encircling the pipe and extending into the body, the sleeve and the nut having coacting interlocking means for contracting the sleeve as the nut is turned on the body and forcing it into the body at a different rate of speed than that at which the nut turns on the body, the interlocking means also preventing retrograde turning of the pipe.

1 designates the body which is in the form of a nipple having a passage 2 for receiving a pipe end, the body being provided at one end with external threads 3. The body is also formed with a cylindrical counterbore 4 at the outer end of the passage 2 and with a tapered counterbore 5 at the outer end of the counterbore 4.

6 is the nut or collar having an internal threaded bore 7 at its inner end for threading on the threaded end 3 of the body 1, and also having a tapered threaded bore 8 at its outer end, the threads of which have a less pitch or are finer than the threads 3 and 7.

9 is the contractile sleeve for clamping the pipe end 10, the sleeve having a threaded tapered end 11 for coacting with the tapered threads 8 of the nut, the inner end of the sleeve abutting against the bottom of the counterbore 5. The sleeve is also provided with a flange 12 which extends into the cylindrical counterbore 4 of the body.

As the nut is turned on the body 1, the threads 8 of the nut also turn on the threaded end 11 of the sleeve, and these threads being of a different pitch than the threads 3 and 7 contract the sleeve on the pipe end as the sleeve is thrust against the bottom of the counterbore 5. The threads 8 and 11 constitute interlocking means on the nut and sleeve for contracting the sleeve as the sleeve is thrust into the body, which interlocking means holds the pipe from retrograde turning.

Preferably, the abutting end surfaces of the sleeve and the body are cam shaped to facilitate the contracting of the sleeve as it is forced into the end. As shown, the bottom of the counterbore 5 is conical and the coacting end surfaces 13 of the sleeve are also conical. For facilitating the contracting of the sleeve, the threads 11 are interrupted and also the surfaces 13 are interrupted.

As here shown, the sleeve 9 is split to make it contractile and is formed with a circular bore for conforming to the pipe end 10 and the sleeve is shown as angular in general form and is shown as square with the threads 11 and the cam surfaces 13 provided at the corner portions of the square formation, and thus the threaded portions 11 and the cam surfaces 13 are arranged in line in a direction lengthwise of the sleeve, The sleeve is formed square by flattening off diametrically opposite portions of a circular sleeve forming the flat spots 14. This form of sleeve also facilitates the contractability of the sleeve. The bore of the sleeve is roughened or provided with projections as 15 for gripping the pipe and particularly for cutting into enamel or other coating on the pipe and also for making firm connection with uncoated pipes.

In Figure 1, the body is shown as formed with a threaded nipple 16 for threading into the internally threaded nipple of a conduit outlet box 17.

In Figure 7, the body 100 is shown as formed double ended for coacting with two conduits or for coupling two pipes together.

In Figure 8, the body 200 is shown as formed integral with a conduit outlet box.

In operation, the sleeve 9 and nut 6 are slipped on the end of the pipe and the pipe end thrust into the passage 2 of the body 1, and the sleeve is brought up so that its conical surface 13 abuts against the conical surface 5 of the body. The nut 6 is then turned on to the threads 3 of the body at the same time the conical threads 8 are turned on the threads 11 of the sleeve and interlocked therewith, these threads 8 and 11 being of a different pitch than the threads 3 and 7 facilitate the contracting of the sleeve and the force of the sleeve inwardly at a less rate of speed than the nut turns on the body 1. The contracting of the sleeve is further facilitated by the coacting cam surfaces 13 and by the fact that these surfaces 13 of the threads 11 are interrupted.

Owing to the interlocking of the nut 6 with the sleeve 9 retrograde turning of the pipe is prevented, it being understood that after a pipe is fixed at one end, oftentimes the workman in attaching the other end is inclined to manipulate the pipe with the wrench and hence loosen the connection already made.

What I claim is:

1. A pipe connection comprising an externally threaded body having a bore for receiving a pipe end, a nut having threads at one end turning on the body, a contractile sleeve for enclosing the pipe end, the sleeve and the nut having coacting positive interlocking cam means for contracting the sleeve as the nut is turned on the body and locking the sleeve from retrograde movement.

2. A pipe connection comprising an externally threaded body having a passage for receiving a pipe end, a nut threading at one end of the body and formed at its other end with a tapered threaded bore, the threads of which are of different pitch from those threading on the body, a contractile sleeve for encircling the pipe end having a tapered threaded end coacting with the tapered threads of the nut, the body and the sleeve having coacting cam means at their abutting ends for contracting the sleeve as the nut is turned on the body and the sleeve.

3. A pipe connection comprising an externally threaded body having a passage for receiving a pipe end, a nut having internal threads at its inner end turning on the body and internal threads at its outer end of less pitch than the threads turning on the body, a contractile sleeve extending into the body, the sleeve and the body having abutting end surfaces and the sleeve having a tapered threaded end coacting with the threaded bore at the outer end of the nut.

4. A pipe connection comprising an externally threaded body having a passage for receiving a pipe end, a nut threading at one end on the body and formed at its other end with a tapered threaded bore, the threads of which are of different pitch from those threading on the body, a contractile sleeve for encircling the pipe end having a tapered threaded end coacting with the tapered threaded bore of the nut, the body and the sleeve having coacting cam means at their abutting ends for contracting the sleeve as the nut is turned on the body and the sleeve, the cam surfaces of the sleeve being interrupted at intervals.

5. A pipe connection comprising an externally threaded body having a passage for receiving a pipe end, a nut threading at one end on the body and formed at its other end with a tapered threaded bore, the threads of which are of different pitch from those threading on the body, a contractile sleeve for encircling the pipe end having a tapered threaded end coacting with the tapered threaded bore of the nut, the body and the sleeve having coacting cam means at their abutting ends for contracting the sleeve as the nut is turned on the body and the sleeve, the tapered threaded end of the sleeve being at a lesser angle than the cam surface to the axis of the sleeve, whereby upon tightening of the nut upon the body and the sleeve, the sleeve and the nut are interlocked against retrograde movement.

In testimony whereof, I have hereunto signed my name, at Syracuse, in the county of Onondaga, and State of New York, this 27 day of Sept., 1928.

JOHN T. PEARSON.